(12) United States Patent
Schmidt-Bleker et al.

(10) Patent No.: US 11,032,898 B2
(45) Date of Patent: Jun. 8, 2021

(54) MODULAR PLASMA JET TREATMENT SYSTEM

(71) Applicant: Leibniz-Institut für Plasmaforschung und Technologie e.V., Greifswald (DE)

(72) Inventors: Ansgar Schmidt-Bleker, Bielefeld (DE); Klaus-Dieter Weltmann, Ostseebad Binz (DE); Jörn Winter, Greifswald (DE)

(73) Assignee: LEIBNIZ-INSTITUT FÜR PLASMAFORSCHUNG UND TECHNOLOGIE E.V., Greifswald (DE)

(*) Notice: Subject to any disclaimer, the term of this patent is extended or adjusted under 35 U.S.C. 154(b) by 348 days.

(21) Appl. No.: 16/161,680

(22) Filed: Oct. 16, 2018

(65) Prior Publication Data

US 2019/0124754 A1    Apr. 25, 2019

(30) Foreign Application Priority Data

Oct. 17, 2017  (EP) .................................. 17196914

(51) Int. Cl.
| | | |
|---|---|---|
| *H05H 1/24* | (2006.01) | |
| *H05H 1/26* | (2006.01) | |
| *A61C 19/06* | (2006.01) | |

(52) U.S. Cl.
CPC .......... *H05H 1/2406* (2013.01); *A61C 19/06* (2013.01); *H05H 2001/2412* (2013.01);
(Continued)

(58) Field of Classification Search
CPC ... A61C 19/06–066; H05H 1/24–2406; H05H 1/26–341
See application file for complete search history.

(56) References Cited

U.S. PATENT DOCUMENTS

| | | | | |
|---|---|---|---|---|
| 3,304,719 A | * | 2/1967 | Ducati | ..................... H05H 1/32 60/203.1 |
| 3,521,023 A | * | 7/1970 | Dahlman | ............... B23K 10/00 219/75 |

(Continued)

FOREIGN PATENT DOCUMENTS

| | | |
|---|---|---|
| EP | 2717657 | 9/2014 |
| WO | 2014023276 | 2/2014 |
| WO | 2015/083155 | 6/2015 |

*Primary Examiner* — Michael A Laflame, Jr
(74) *Attorney, Agent, or Firm* — JMB Davis Ben-David

(57) ABSTRACT

A modular plasma jet treatment system comprising a plasma source with a high-voltage module comprising a high-voltage electrode and first connection means, as well as a plasma jet applicator wherein the plasma jet applicator comprises a cavity for a process gas, wherein a ceiling portion of the cavity is either arranged on the plasma jet applicator and/or on the high-voltage module, the cavity comprising a process gas inlet and at least one plasma jet outlet, wherein the plasma jet applicator comprises a second connection means, such that the plasma jet applicator and the high-voltage module are repeatedly connectable and releasable, wherein, when the plasma jet applicator is connected to the high-voltage module, the cavity is adjacently arranged with the ceiling portion at the high-voltage module, and wherein the cavity is separated by a dielectric from the high-voltage electrode of the high-voltage module.

15 Claims, 6 Drawing Sheets

(52) U.S. Cl.
CPC . *H05H 2001/2418* (2013.01); *H05H 2240/10* (2013.01); *H05H 2240/20* (2013.01); *H05H 2245/122* (2013.01)

(56) References Cited

U.S. PATENT DOCUMENTS

2009/0188626 A1   7/2009  Lu et al.
2016/0106993 A1   4/2016  Watson et al.
2016/0227640 A1*  8/2016  Laurisch ................. H05H 1/48

* cited by examiner

MODULAR PLASMA JET TREATMENT SYSTEM

CROSS-REFERENCE TO RELATED APPLICATION

Benefit is claimed to European Patent Application No. 17196914.0, filed Oct. 17, 2017, the content of which is incorporated by reference herein in its entirety.

FIELD

The invention relates to a modular plasma jet treatment system for medical applications and the treatment of biological material according to claim 1.

BACKGROUND

Plasma jets are used in various technical and medical applications. Particularly in medical applications such as tooth treatment that require a punctiform surface treatment, plasma jets are of advantage.

In order to treat larger surfaces with plasma jets, so-called plasma jet arrays are often used. Plasma jet arrays comprise a plurality of plasma jets that are arranged next to each other, forming an array.

The manufacturing costs and the complexity of such plasma jet array devices increase with the intended treatment area of such a plasma jet array.

On the other hand, particularly in medical applications, it is beneficial that a plasma source for surface treatment is adaptable to different treatment area geometries and sizes. This problem is usually addressed with devices based on the generation of a Dielectric Barrier Discharge (DBD) plasma.

However, particularly in oral applications such as tooth treatment, it is mandatory to use plasma jets that are oriented or orientable at different angles and adjustable in length in order to facilitate treatment of regions that are difficult to access. With DBD sources this is difficult to achieve.

Modular plasma systems are known in the state-of-the-art allowing the exchange of the plasma jet applicator. The plasma jet applicator comprises the portion of the plasma device at which the plasma exits the plasma device and that might get in direct contact with the treatment surface.

For example, EP13756295B1, DE102014220488A1 and DE202009011521U1 disclose plasma sources with adaptable applicator surfaces. However, these plasma devices are based on DBD and are thus not suited for the generation of plasma jets. Moreover, said devices comprise applicators that are designed for direct contact with the treatment area, which might proof disadvantageous for certain applications.

Several plasma jet array devices are known in the state-of-the-art. However, while some of them are not modular, i.e. they are not configured for exchanging the plasma jet applicator, the manufacturing costs and complexity of these devices increase proportionally with the number of plasma jets provided. Examples of such devices are disclosed in US20090188626A1 and DE19722624A1.

US20090188626A1 in particular discloses a single plasma jet device that is scalable to a multi-jet plasma device, providing a plasma jet array. However, the device providing a plurality of plasma jets is essentially manufactured by arranging the single plasma jet device multiple times next to each other. The manufacturing and material costs are therefore proportional to the number of produced plasma jets.

Alternatively, Sun et al. [1] discloses a plasma jet array that is manufactured by casting a plurality of stick-like electrodes in a silicon block.

This assembly provides a fixed-size plasma jet array. Varying the number of electrodes or plasma jets by exchanging the plasma jet applicator is neither intended nor possible.

Also, in DE19722624A1 a plurality of plasma jets is generated based on a hollow cathode geometry. However, this device lacks the modularity in terms of the plasma jet applicator.

Robert et el. [2] teaches a modular plasma jet producing device, that can be adapted by changing the plasma jet applicator. However, the plasma is not produced in the plasma jet applicator but it is generated in a different part of the device. While this keeps the manufacturing costs for the plasma jet applicator comparably low, the resulting plasma jets might not be uniform, as the plasma has to be guided to the plasma jet applicator.

The objective of the invention is therefore to provide a modular plasma jet generating system for the uniform and specific generation of a variable number of plasma jets for different treatment geometries.

SUMMARY

The problem is solved by a modular plasma jet treatment system according to claim 1. Advantageous embodiments are described in the subclaims.

According to claim 1, a modular plasma jet producing system for medical applications, particularly for oral applications, such as tooth treatment, comprises a plasma source with at least the following components:

A high-voltage module comprising a high-voltage electrode and first connection means, wherein the high-voltage module is particularly an AC (alternating current) high-voltage module, A plasma jet applicator configured to ignite a plasma in the cavity with the voltage provided to the high-voltage electrode and to produce at least one plasma jet, when the system is in its assembled state, wherein the plasma jet applicator comprises a cavity for a process gas, wherein a ceiling portion of the cavity that is particularly of purely geometric nature, i.e. not solid, is either arranged on the plasma jet applicator and/or on the high-voltage module, such that in the assembled state of the system, the cavity forms an ionization chamber in which the plasma is generated, the cavity or the plasma jet applicator comprising a) at least one plasma jet outlet,
b) a process gas inlet, wherein the plasma jet applicator comprises a second connection means, wherein the first and second connection means are configured such that the plasma jet applicator and the high-voltage module are repeatedly connectable and releasable from each other, wherein, when the plasma jet applicator is connected by the connection means to the high-voltage module, the cavity adjoins the high-voltage module with the ceiling portion, and wherein the cavity is separated by a dielectric from the high-voltage electrode of the high-voltage module.

Such a system allows for the use of variously shaped plasma jet applicators that are connectable by the first and second connection means to the high-voltage module.

BRIEF DESCRIPTION OF THE FIGURES

Further features and advantages of the invention are detailed by means of examples in the following figure description. It is shown in FIG. 1 a schematic cross-section through a first embodiment of the system.

DETAILED DESCRIPTION

Figure 1:
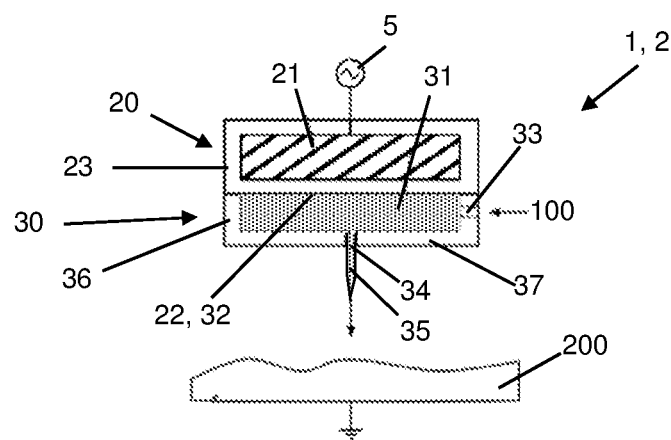

In contrast to other plasma sources such as DBE sources, a plasma jet source generates a plasma plume that extends up to several centimeters from the electrodes of the device. The extension of the plasma plume is caused by the gas flow, the electric field generated by both the plasma jet source and the plasma itself and/or the lower electric field required for a self-sustained propagation of ionization waves in the cavity formed by the process gas, particularly if noble gases are used as process gas and/or the interaction of the plasma in the cavity with the surrounding gas (particularly ambient air).

The system according to the invention can be used in various applications by simply exchanging the plasma jet applicator with a different plasma jet applicator for example having a different shape or a plasma jet outlet at another position.

It is noted that the manufacturing costs and complexity remain almost constant, as the complexity of a plasma jet applicator is not increasing with the number of plasma outlets. A plasma jet applicator with a higher number of plasma jet outlets might just be larger than a plasma jet applicator with only one plasma jet outlet. The complexity of both plasma jet applicators is essentially the same.

The system according to the invention can furthermore be configured to generate a process gas flow through the cavity of the plasma jet applicator such that the at least one plasma jet is produced at the plasma jet outlet. The process gas flow can, for example, be generated by a gas pump.

The dielectric can be comprised by the high-voltage module and/or the plasma jet applicator, particularly wherein the dielectric is comprised by the ceiling portion.

The separation of the cavity from the high-voltage electrode by at least one dielectric prevents the formation of an arc between the high-voltage electrode and the treated sample, e.g. skin, tooth or gums, even when operating the device at high voltages. The formation of an arc can lead to burns or potentially lethal electric shocks.

The high-voltage module is particularly encompassing the cavity on at least one and up to three sides of the cavity, particularly comprising the cavity walls and/or the ceiling portion. The walls and the ceiling portion can be made from the dielectric or can comprise the dielectric.

Alternatively, the plasma jet applicator can comprise the cavity completely, i.e. the plasma jet applicator comprises the wall portions, the bottom portion and the ceiling portion, such that the cavity essentially forms a chamber.

Alternatively, the plasma jet applicator can comprise the wall portions and the bottom portion of the cavity. The ceiling portion of the cavity then is comprised at least partially by the high voltage module.

In the assembled state of the system, however, the cavity particularly always forms an essentially closed chamber with a process gas inlet and a plasma jet outlet. The cavity or chamber can also be formed as a channel particularly extending from the process gas inlet through the high-voltage electrode, through the plasma jet applicator to the plasma jet outlet.

High-voltage in the context of the present specification refers to a voltage of more than 500 V, particularly more than 1 kV, more particularly a voltage between 2 kV and 40 kV.

The system particularly comprises a process gas source, such as a gas container, or a gas reservoir that is connected or connectable to the system.

The process gas is particularly a noble gas and/or nitrogen. It is possible to mix the process gas with another gas, such as for example air and/or water vapor. The amount of mixed air can be controlled by a throttle valve. Water vapor can for example be added by guiding the process gas through a gas washing bottle, particularly a gas washing bottle with adjustable temperature or a nebulizer.

The process gas inlet is particularly arranged at the ceiling portion of the cavity or at a wall of the cavity. The process gas inlet can, for example, be the ceiling portion or be comprised by the ceiling portion. The dielectric separating the cavity from the high-voltage electrode of the high-voltage module is then arranged such that it is not the ceiling portion.

The connection between the high-voltage module and the plasma jet applicator is established by connection means; the first and the second connection means. The first connection means at the high-voltage module can consist of or comprise particularly an electrical conducting connector as detailed further down, which can consist of or comprise a magnet that pulls the second connection means, i.e. the grounded electrode at the plasma jet applicator, towards the high-voltage module. Of course the magnet can also be arranged on the plasma jet applicator.

The resulting magnetic connection can quickly be locked and released while no further mechanical part is required.

The connection means can also be realized as a latch, particularly a snap latch, whereas one or more cantilever beams are located at either the high-voltage module or the plasma jet applicator and the corresponding groove is located at the plasma jet applicator or high-voltage module, respectively.

The system can be connected to an electrical power source in order to be able to generate the plasma.

According to another embodiment of the invention, a sealing for preventing gas leakage is provided by a seal arranged between the high-voltage module and the plasma jet applicator.

The seal can be a separate part or is attached to the high-voltage module or the plasma jet applicator in such a way that it prevents leakage of the process gas, when the high-voltage module and plasma jet applicator are connected.

According to an embodiment of the invention, the high-voltage electrode of the high-voltage module has a surface facing towards the cavity, particularly towards the ceiling portion, wherein said surface is planar and particularly comprises a surface area of at least 1 cm$^2$.

The planar surface is particularly facing towards the at least one plasma jet outlet.

This embodiment allows for the treatment of larger surfaces, when multiple plasma jets are employed.

According to another embodiment of the invention, the cavity, particularly the ceiling portion, comprises a second electrode, wherein the second electrode is kept at a floating electric potential, when plasma is generated in the plasma jet applicator.

The second electrode comprises particularly a cavity-facing surface that is larger than the surface of the high-voltage electrode facing the cavity or the plasma jet outlet.

An electrode that is at a floating electric potential in the context of the specification refers to an electrode, which is not connected to a given reference potential or a voltage generator, but is a piece of conductive material, which is separated from all further electrically conductive materials through a dielectric. The second electrode that is kept on the floating electric potential provides an electric potential that is uniformly distributed over the area of said second electrode, even if the surface of the high-voltage electrode that faces the cavity is of smaller dimensions.

The second electrode is particularly arranged on the plasma jet applicator.

This embodiment allows for a comparably compact high-voltage module that nonetheless can be used to generate plasma jet arrays for larger areas.

This embodiment is particularly useful for cauterisations.

The size of the second electrode controls the electric current through the plasma jet and influences its temperature.

According to another embodiment of the invention, the plasma jet applicator comprises a dielectric layer with an electric permittivity of greater than 20, wherein said dielectric layer is particularly arranged on the ceiling portion of the cavity, particularly on the second electrode, particularly on the side of the second electrode facing inward the cavity.

The dielectric layer essentially has the same effect as the second electrode, as it allows for a uniform distribution of the electric potential on a larger surface even though the high-voltage electrode might be of smaller dimensions.

According to another embodiment of the invention, the plasma jet applicator comprises a planar and particularly extensive high-voltage electrode that is configured such that it is in electrical contact with the high-voltage electrode of the high-voltage module, when the plasma jet applicator is connected to the high-voltage module, wherein the planar high-voltage electrode of the plasma jet applicator is particularly arranged at the ceiling portion of the cavity, wherein, in accordance to this embodiment, the ceiling portion is comprised by the plasma jet applicator.

The high-voltage electrode of the plasma jet applicator is therefore on the same electric potential as the high-voltage electrode of the high-voltage module, when the system is in its assembled state.

On the surface of the second high-voltage electrode that faces inward the cavity, a dielectric layer can be arranged such that the cavity is separated by this dielectric layer from the second high-voltage electrode.

The surface of the second high-voltage electrode that faces inward the cavity is particularly larger than the surface of the high-voltage electrode of the high-voltage module facing towards the cavity.

This embodiment allows that the surface area of the second electrode facing the cavity can be larger than the surface area of the high-voltage electrode of the high-voltage module and thus the electric potential that is used for generating the plasma jets is distributed uniformly along the cavity such that the generated plasma jets are uniform.

This embodiment allows for a compact high-voltage module.

According to another embodiment of the invention, the plasma jet applicator and particularly the cavity comprises a planar bottom portion or a planar bottom that is arranged opposite the ceiling portion, wherein the at least one plasma outlet is arranged at the bottom portion.

The bottom portion is connected to the ceiling portion by wall portions of the cavity. The bottom portion, as well as the wall portions, can comprise the dielectric that is used for separating the high-voltage electrode from the cavity.

According to another embodiment of the invention, the plasma jet applicator comprises a ground electrode, wherein said ground electrode is particularly arranged at the bottom portion of the cavity, particularly on an outer side of the bottom portion that faces away from the cavity, wherein the ground electrode is particularly arranged around the at least one plasma jet outlet.

The ground electrode arranged at the bottom portion of the cavity facilitates that the plasma jets reach out of the cavity to a greater extent than without the ground electrode arranged at the bottom portion.

A system with such an applicator is capable to produce plasma jets that reach out of the plasma jet outlets to a greater extend (as compared to an applicator with no ground electrode) even though there is no grounded surface nearby.

Furthermore, the ground electrode can be enclosed by a dielectric particularly by the dielectric that separates the cavity from the high-voltage module.

This embodiment allows for applying a higher voltage to the high-voltage electrode and for preventing a flashover to the ground electrode.

According to another embodiment of the invention, the high-voltage module comprises at least one electrical conducting connector particularly two connectors for increased safety, for the ground electrode and wherein the ground electrode is connected to said electrical connector, when the plasma jet applicator is connected to the high-voltage module.

This embodiment allows for the provision of ground potential by the high-voltage module or other parts of the system according to the invention.

According to another embodiment of the invention, the system is configured such that a plasma can only generated if all connectors of the at least one connector, or the plurality of connectors are electrically connected with the ground electrode of the plasma jet applicator.

For this purpose, the system can comprise a protective circuit that monitors the electric conductivity of the at least one connector.

The at least one connector can be or comprise the first and second connection means.

According to another embodiment of the invention, the plasma jet applicator comprises a plurality of plasma jet outlets, wherein the plasma jet outlets are arranged in an array, particularly in a hexagonal array in the bottom portion, and particularly wherein the plurality of plasma jet outlets is connected to the gas inlet by the cavity. The cavity can be branched in various cavity sections for this purpose.

The plasma jet applicator having a plurality of plasma jet outlets can be used for the treatment of extensive surface regions. The system with an applicator having said plurality of plasma jet outlets, for example four or eight outlets, is well suited for treatment of extensive regions.

One advantage of the hexagonal array geometry is that the plasma jets are arranged particularly dense.

According to another embodiment of the invention, the system comprises a second applicator with the features of the plasma jet applicator according to the invention.

A system according to this embodiment comprises two applicators that are interchangeably connectable to the high-voltage module. The plasma jet applicators might have a different number of plasma jet outlets or have the plasma jet(s) produced at a different angle.

Thus, the second applicator is particularly different in terms of the number of plasma jet outlets, or the plasma jet outlet geometry.

This embodiment provides a versatile and modular plasma treatment system.

According to another embodiment of the invention, the system is configured such that each of the plurality of applicators comprises a different electric feature, such as the ohmic resistance, an impedance or a capacity, at the connectors such that the system can be configured adjust the operation parameters, such as the supplied high-voltage according to the electric feature of the connector.

According to another embodiment of the invention, the second electrode is planar and is arranged opposite the plasma jet outlets, wherein the second electrode particularly comprises protrusions opposite of each of the at least one plasma jet outlet.

The protrusions effectuate a local increase of the electrical field strength at the protrusions.

According to another embodiment of the invention, the cavity comprises at least two cavity sections that each end with a first end at the process gas inlet and with a second end at a separate plasma jet outlet.

This geometry allows for the efficient distribution of the process gas to the plasma jet outlets from a single gas inlet.

According to another embodiment of the invention, the plasma jet applicator comprises at least one curtain gas cavity with at least one curtain gas outlet that is designed for sheathing the process gas and/or plasma with a curtain gas, when the plasma exits the at least one plasma jet outlet.

The curtain gas cavity can comprise a plurality of curtain gas cavity sections that particularly branch of from a curtain gas inlet and lead to a plurality of curtain gas outlets that are particularly arranged around the at least one plasma jet outlet.

This geometry, therefore, assures that curtain gas is guided and distributed such that it shields the plasma jet from the surrounding atmosphere.

This embodiment prevents that a plasma jet from a first plasma gas outlet cross-talks to a plasma jet from another adjacent plasma jet outlet.

Furthermore, it allows identical atmospheric conditions at each plasma jet outlet, which is particularly important when working with large plasma jet arrays. In large plasma jet arrays, for example, the inner plasma jets find an atmosphere enriched with process gas as compared to plasma jet at the periphery of the plasma jet array.

Moreover, the curtain gas might contribute to the plasma chemistry at the plasma jets.

A curtain gas can comprise a mixture of air, oxygen, nitrogen or carbon dioxide. The curtain gas can also be a noble gas and/or air, nitrogen or carbon dioxide. If the curtain gas is a noble gas or air, the system particularly comprises an injector that is configured to mix the curtain gas with air. By means of a throttle valve the degree of added air to the curtain gas can be controlled.

In case the process gas and the curtain gas are a mixture of a noble gas and air, it should be taken care that the curtain gas comprises more air than the process gas in order to prevent a cross-talk of adjacent plasma jets.

The curtain gas can also be the surrounding air, which is sucked in the plasma jet applicator during operation by the plasma jets.

This embodiment does not require a separate curtain gas reservoir.

According to another embodiment of the invention, the system comprises a first humidifying means that is configured and arranged for humidifying a process gas or a precursor process gas.

The humidifying means can for example be a gas washing bottle comprising a fluid such as water, wherein the process gas is guided or blown through fluid.

According to another embodiment of the invention, the system comprises a second plasma source that is arranged upstream the plasma source and configured to generate a plasma from a precursor-process gas, wherein the plasma generated by the upstream plasma source comprises or produces the process gas, wherein the system is configured e.g. by correspondingly arranged tubes and pipes, to provide the process gas exiting from the upstream second plasma source to the plasma source for generating a plasma with the process gas, wherein the system particularly further comprises a second humidifying means for humidifying the precursor-process gas before the precursor-process gas is used for generating the plasma with the plasma source.

This embodiment is allows for modifying the plasma chemistry at the plasma jet(s) produced at the plasma jet outlet(s).

The upstream plasma source can for instance be a dielectric barrier discharge plasma source to produce a non-thermal plasma or a thermal arc plasma source. Furthermore, a combination of different plasma types is possible, too.

According to another embodiment of the invention, the plasma jet applicator comprises an identifying feature such as for example an electric resistance, an impedance or a capacity, wherein the system is configured to determine said identifying feature and to automatically adapt a voltage at the high-voltage module and other control parameters for the plasma to be generated with the plasma jet applicator.

The identifying feature allows for identification of the specific type of the plasma jet applicator, i.e. the number of plasma jet outlets, the specific geometry, and/or other properties of the plasma jet applicator.

The identifying feature can, for example, be a determined resistance between two ground electrode contacts.

This embodiment allows for the automatic adjustment of the ideal operating conditions for the specific applicator.

According to another embodiment of the invention, the plasma jet applicator is configured to be switched in a non-functional state, i.e. to a state where the plasma jet applicator no longer is configured to produce a plasma jet.

For this purpose, the plasma jet applicator comprises, for example, a fuse that is blown, when the plasma jet applicator should be switched in the non-functional state.

The high-voltage module can be configured to apply a corresponding voltage peak to blow the fuse in the plasma jet applicator, after a predefined time of use of the plasma jet applicator.

According to another embodiment of the invention, the system comprises further a device for the generation of pulsed electric fields.

In FIG. 1 a cross-section through a system 1 is shown. The system 1 is in its assembled state and comprises a high-voltage module 20 comprising a high-voltage electrode 21. The high-voltage electrode 21 is enclosed by a dielectric 23 from all sides. One of the high-voltage module's surfaces 22 is the ceiling 32 of a process gas cavity 31 of the plasma jet applicator 30. The ceiling 32 is planar and has an area larger than 1 cm$^2$. The high-voltage electrode's surface 22 is thus facing towards the ceiling portion 32.

The plasma jet applicator 30 comprises the cavity 31 for the process gas 100, wherein the plasma jet applicator 30 has a process gas inlet 33 on one of its sides that comprise the wall portions 36 of the cavity 31 or the ceiling 32. On a bottom portion 37 opposite the ceiling 32, a plasma jet outlet 34 is located in the centre of the bottom portion 37. The bottom portion 37 and the walls 36 on the side of the plasma jet applicator 30 are made from a dielectric.

The high-voltage module 20 is configured to provide voltages high enough to ignite a plasma in the cavity 31 of the plasma jet applicator 30. The plasma jet 35 exiting the plasma jet outlet 34 is comparably short as long as there is no ground potential in the proximity of the plasma jet outlet 34.

This configuration of the system 1 is particularly useful for treating local, punctiform areas with the plasma jet 35, such as for example cavities on a tooth.

Figure 2:
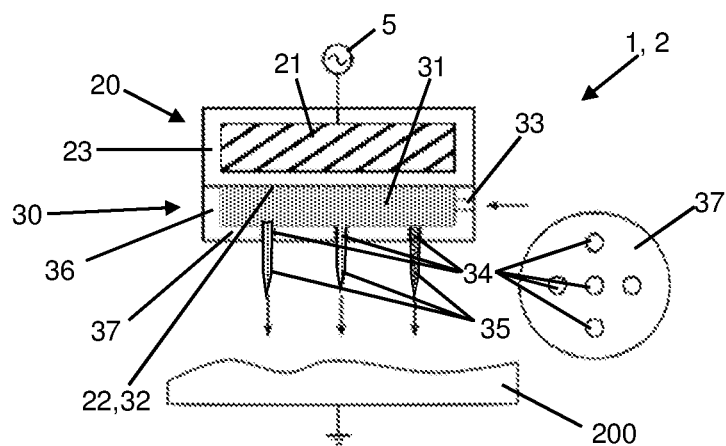
FIG. 2 a schematic cross-section through a second embodiment of the system.

In FIG. 2 a cross-section of a system 1 similar to the system in FIG. 1 is shown. In contrast to FIG. 1 the plasma jet applicator 30 comprises five plasma jet outlets 34 that are arranged in shape of a cross on the bottom 37 of the plasma jet applicator 30 (shown as a bottom view next to the cross-sectional view)

This configuration is advantageous, when larger areas are to be treated with plasma jets 35.

Starting with a system 1 that is configured as shown in FIG. 1, the system 1 can easily be modified by disassembling the plasma jet applicator 30 from the high-voltage module 20 and replacing the plasma jet applicator 30 with an applicator 30 having five plasma jet outlets 34 as shown in FIG. 2.

Figure 3:
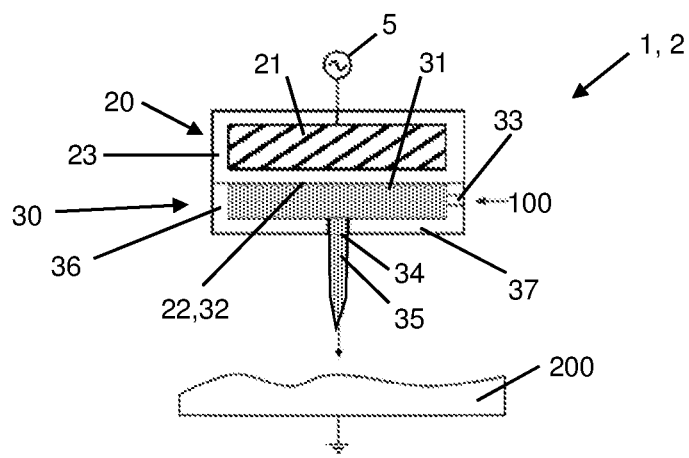
FIG. 3 a schematic cross-section through a third embodiment of the system.

In FIG. 3 an embodiment is shown, where the plasma jet applicator 30 comprises a plasma jet outlet 34 that is larger than the plasma jet outlet 34 shown in FIG. 1. Consequently, a larger and longer plasma jet 35 can be produced by using this applicator 30.

Figure 4:
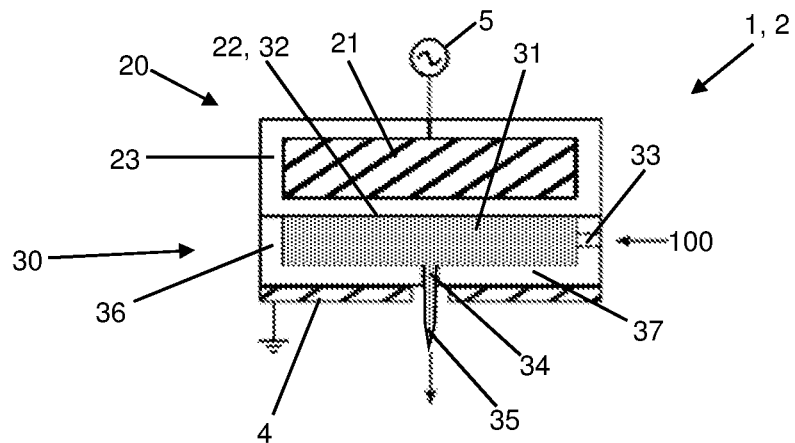
FIG. 4 a schematic cross-section through a system comprising a ground electrode and a single plasma jet outlet.

FIG. 4 shows a cross-section through a system 1, wherein in comparison to FIG. 1, the plasma jet applicator 30 comprises a ground electrode 4. The ground electrode 4 is arranged on the bottom portion 37 of the plasma jet applicator 30.

Figure 5:
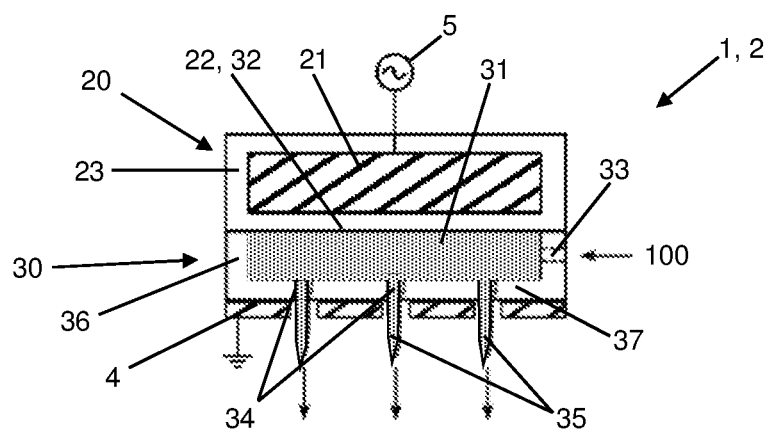
FIG. 5 a schematic cross-section through a system comprising a ground electrode and a plurality of plasma jet outlets.

Analogously, the system shown in FIG. 5 comprises an applicator 30 comparable to the plasma jet applicator 30 shown in FIG. 2 but also with a ground electrode 4 arranged at the bottom portion 37.

The systems 1 shown in FIGS. 4 and 5 will produce a plasma jet 35 independently of the presence of a surface on ground potential near the plasma jet applicator 30.

Figure 6:
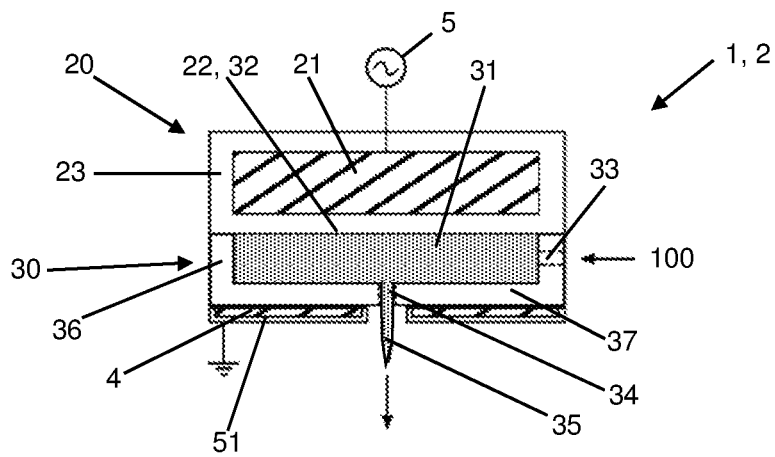
FIG. 6 a schematic cross-section through a system comprising a covered ground electrode.

In FIG. 6 a similar embodiment as depicted in FIG. 4 is shown. As in FIG. 4, the plasma jet applicator 30 comprises a ground electrode 4 on its bottom portion 37, wherein the plasma jet applicator 30 in FIG. 6 additionally has the ground electrode 4 enclosed by a dielectric 51. This embodiment allows for higher voltages applied to the plasma jet applicator 30 and thus for stronger plasma jets 35 to be produced.

Evidently, it is possible to enclose also the ground electrode 4 of the plasma jet applicator 30 shown for example in FIG. 5 to achieve the same effect (not shown).

Figure 7:
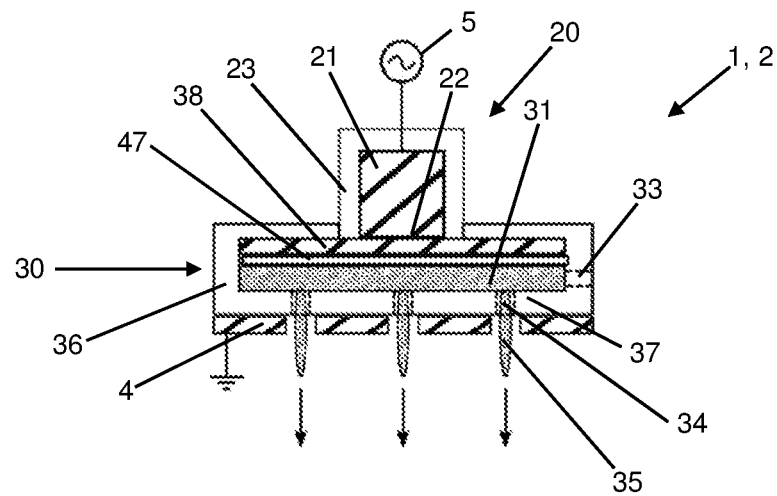
FIG. 7 a schematic cross-section through a system comprising a high-voltage electrode in the plasma jet applicator.

In FIG. 7 a cross-section of a system 1 is shown. The system 1 comprises the high-voltage module 20, wherein the high-voltage electrode 21 has a smaller surface 22 facing towards the plasma jet applicator 30 than the high-voltage electrode of e.g. FIG. 1.

Furthermore, the side of the high-voltage module 20, 22 facing the ceiling potion 32 of the cavity 31 has the high-voltage electrode 21 exposed. The plasma jet applicator comprises on the ceiling portion 31 a high-voltage electrode 38 that is extending throughout the ceiling 32 of the cavity 31. The high-voltage electrode 38 of the plasma jet applicator 30 extend flat along the ceiling portion 32 of the cavity 31 of the plasma jet applicator 30, and is in electrical contact with the high-voltage electrode 21 of the high-voltage module 20.

When the voltage is applied to the high-voltage module 20, the high-voltage electrode 38 in the plasma jet applicator 30 is at the same potential as the high-voltage electrode 21 in the high-voltage module 20.

The high-voltage electrode 38 in the plasma jet applicator 30 has the side facing the cavity 31 covered by a dielectric 51, such that the process gas 100 in the cavity 31 is not in contact with the high-voltage electrode 38.

On the bottom 37, the plasma jet applicator 30 has the ground electrode 4 arranged.

As the high-voltage electrode 38 in the plasma jet applicator 30 extends along the cavity 31, the plasma jets 35 experience a comparable homogeneous electric potential and are comparably uniform.

Figure 8:
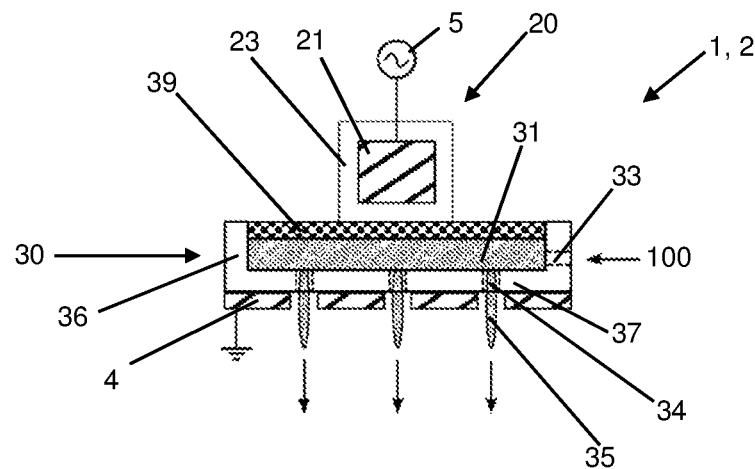
FIG. 8 a schematic cross-section through a system comprising an electrode on floating potential.

In FIG. 8 a cross-section through a system 1 is shown, where the ceiling portion 32 of the cavity 31 of the plasma jet applicator 30 is made of an electrode 39 that is kept on a floating electric potential.

The floating potential electrode 39 extends over the whole ceiling portion 32. The effect of this arrangement is that the electric potential is uniformly distributed along the cavity 31, which results in more homogenous plasma jets 35, even though the high-voltage electrode 21 of the high-voltage module 20 is of much smaller dimensions.

This embodiment can be particularly used for cauterisations. The size of the second electrode 39 controls the electric current through the plasma jets 35 and also its temperature.

Figure 9:
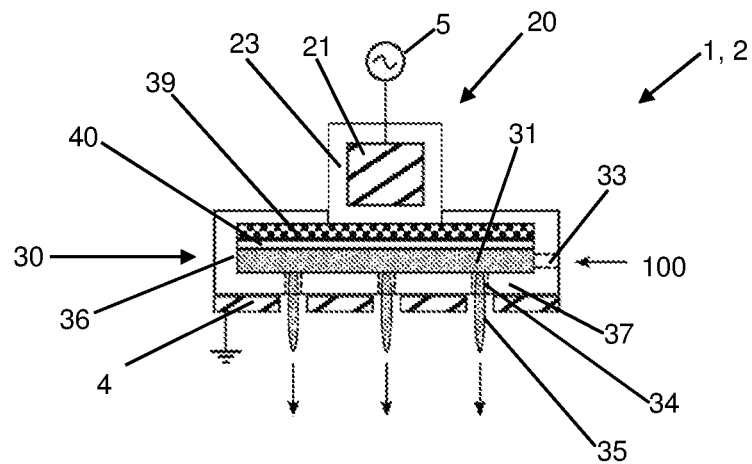
FIG. 9 a schematic cross-section through a system comprising a high permittivity dielectric.

FIG. 9 shows an embodiment of the system 1, where the ceiling portion 32 of the cavity 31 comprises an electrode 39 that is kept on a floating electric potential and wherein said electrode 39 is covered with a dielectric layer 40 with a high dielectric permittivity, particularly greater than 20.

As in FIG. 8, the electrode 39 extends along the whole ceiling portion 32. The high-voltage electrode 21 of the high-voltage module 20 can be of smaller dimensions and thus the high-voltage module 20 can be built smaller.

Figure 10:
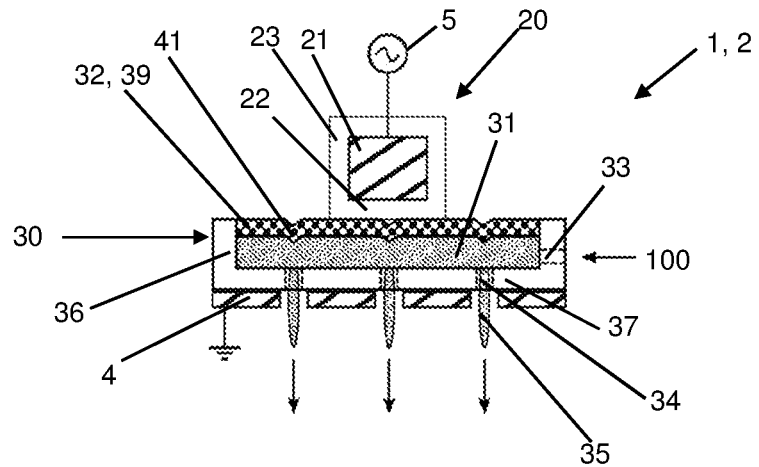
FIG. 10 a schematic cross-section through a system comprising an electrode with protrusions.

In FIG. 10 the electrode 39 that is kept on a floating electric potential comprises protrusions 41 opposite the plasma jet outlets 34. The protrusions 41 increase the field strength at the protrusions 41, leading to stronger plasma jets 35 at the outlets 34 of the plasma jet applicator 30.

Figure 11:
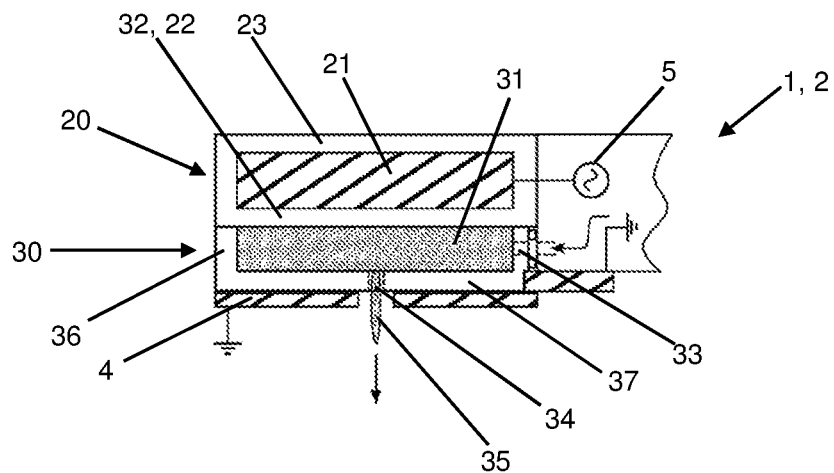
FIG. 11 a schematic cross-section through an embodiment of the system comprising the electric contacts on the side.

FIG. 11 shows an embodiment similar to FIG. 6, but with the electric supply contacts 5 arranged at sides of the system 1. This arrangement is particularly advantageous for oral applications. The high-voltage module 20 and the ground electrode 4 on the bottom portion 37 of the plasma jet applicator 30 have their electric supply contacts 5 arranged on the same side as the process gas inlet 33 is arranged.

Figure 12:
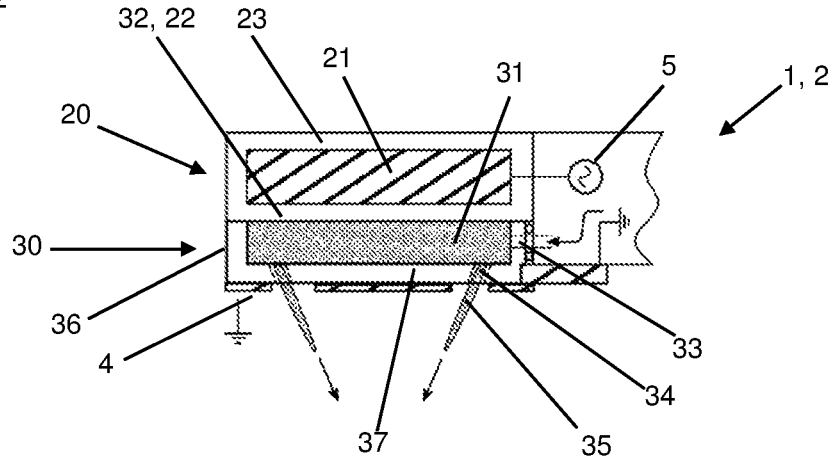
FIG. 12 a schematic cross-section through a system providing plasma jets at an angle.

Additionally to the electric contacting 5, the plasma jet applicator 30 in FIG. 12 provides plasma jet outlets 34 that are configured to generate plasma jets 35 that are at an angle to each other. This configuration is also advantageous for oral applications.

Figure 13:
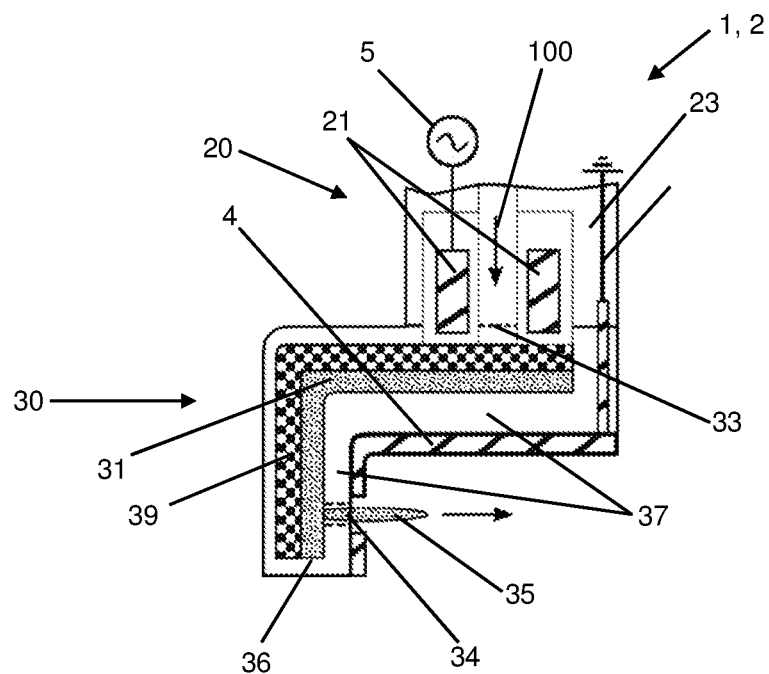
FIG. 13 a schematic cross-section through a system with an L-shaped applicator.

Yet another shape designed particularly for oral applications is shown in FIG. 13.

Here, the plasma jet applicator 30 is L-shaped and is configured to provide a plasma jet 35 that is inclined by 90 degrees.

The high-voltage module 20 comprises an electric contact for the ground electrode 4 such that the high-voltage module 20 of the system can provide ground potential as well.

The high-voltage electrode 21 is arranged around the process gas inlet 33 of the plasma jet applicator 30. The ceiling portion 32 of the plasma jet applicator 30 comprises an electrode 39 on a floating electric potential so that the electric potential is evenly distributed along the cavity 31 of the plasma jet applicator, independently of the size and shape of the high-voltage electrode 21 of the high-voltage module 20.

Figure 14:
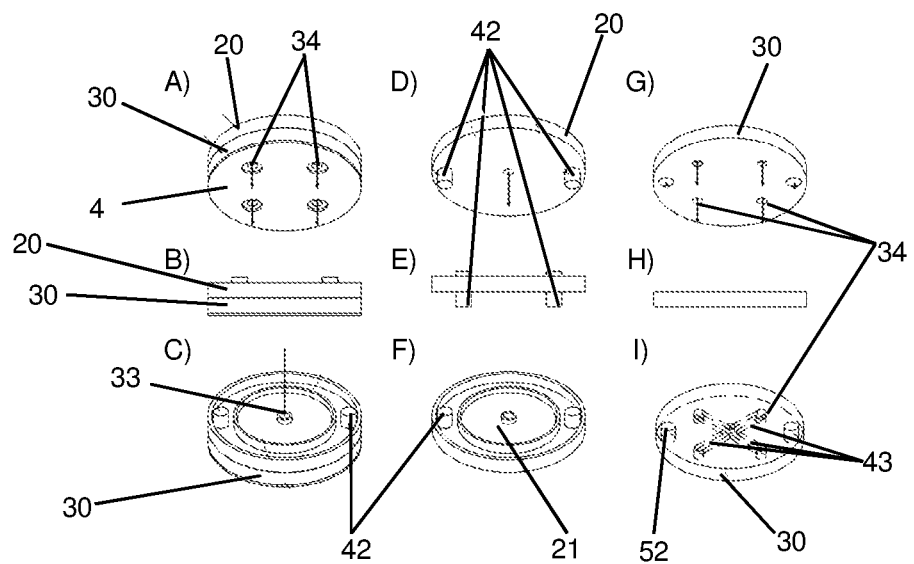
FIG. 14 perspective views of an embodiment of the system.

In FIG. 14 perspective views of the system 1 are shown. In the left column (A)-C)) the assembled system 1 is shown, in the middle column (D)-F)) the high-voltage module 20 is shown and in the right column (G)-I)) the plasma jet applicator 30 is shown.

In panel A), the plasma jet applicator 30 with the ground electrode 4 and four plasma jet outlets 34 is shown. The system 1 is of circular geometry.

In panel B), the high-voltage module 20 can be seen located on top of the plasma jet applicator 30. Two ground contacts 42 can be seen as protrusions for the high-voltage module 20.

In panel C) and panel F), the high-voltage module 20 is viewed from above. The high-voltage module 20 comprises two ground potential contacts 42 for the ground electrode 4 of the plasma jet applicator 30. The high-voltage electrode 21 is disk-shaped, with the process gas inlet 33 in its centre.

The bottom view in panel D) and the side view in panel E) of the high-voltage module 20 reveals that the ground potential contacts 42 continue through the high-voltage module 20 as two pins 42 that are galvanically isolated from the high-voltage electrode 21.

In panel G) the plasma jet applicator 30 is shown without the ground electrode 4. The contact pins 42 for the ground electrode 4 extend through two holes 52 in the plasma jet applicator 30. The plasma jet applicator 30 has four plasma jet outlets 34 arranged in a square.

The plasma jet outlets 34 are connected by a cavity 31 with four cavity sections 43 (see panel I)), wherein each cavity section 43 connects with the process gas inlet 33 and a corresponding plasma jet outlet 34.

The ground electrode 4 on the bottom 37 of the plasma jet applicator 30 is disk shaped and circular.

However, it is conceivable and within the scope of the claimed invention that the ground electrode 4 is of elliptical shape, wherein the high-voltage electrode 38 or the second electrode 39 is of circular shape (not shown).

The latter configuration will lead to particularly high electrical fields over the plasma jet outlets 34.

Figure 15:
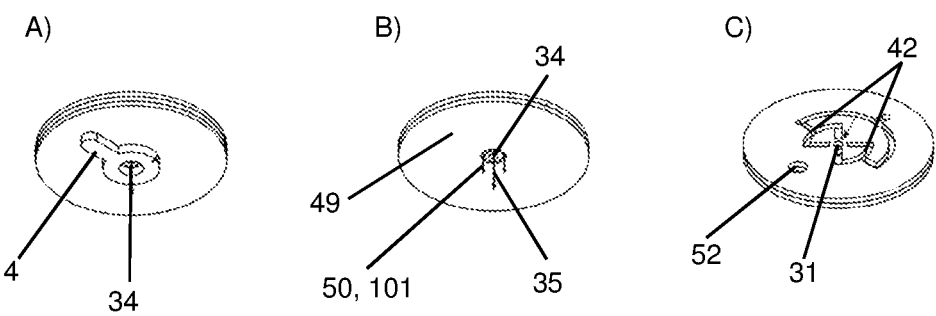
FIG. 15 perspective views of a system configured for the use of a curtain gas.

FIG. 15 shows an embodiment of the invention that comprises curtain gas cavitys 44, that are arranged such in the plasma jet applicator 30 that a stream of curtain gas 101 surrounds the exiting plasma jet 35. See for example panel B) (bottom view, without ground electrode) and panel C) (top view of the plasma jet applicator 30).

In panel A) a bottom view of the plasma jet applicator 30 is shown, wherein a ground electrode 4 is arranged around the plasma jet outlet 34.

Figure 16:
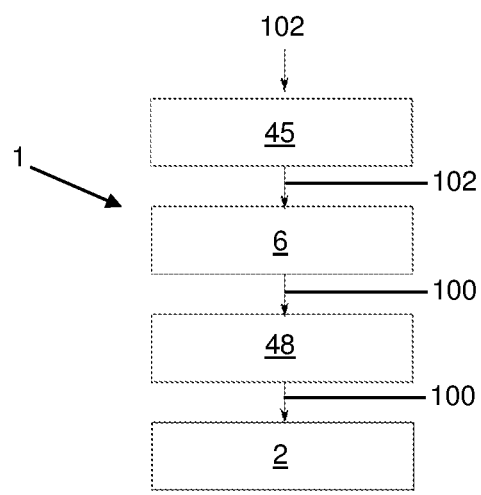
FIG. 16 a flowchart of a system arranged for the use of a second plasma source.

FIG. 16 shows a flow chart of an embodiment, where a second plasma source 6 is arranged upstream the plasma source 2 of the system. Prior a precursor gas 102 is fed to the second plasma source 6 the precursor process gas 102 is humidified by a gas humidifier 45.

The humidified gas 102 is then lead to the second plasma source 6 that is arranged upstream the plasma source 2. The exiting gas, altered by the plasma of the second plasma source 6, is now the process gas 100 for the plasma source 2. The process gas 100 is humidified by a second humidifier 48 and then submitted to the plasma source 2 of the system 1 comprising the high-voltage module 20 and the plasma jet applicator 30.

This way it is possible to control the plasma chemistry to great extent. For example, the additional second plasma source can be used to provide a gas that is dominated by $NO_x$ or by $O_x$ species. Such plasma sources are state of the art, e.g. as presented in [3]. The ability to tune the plasma chemistry is advantageous, as the plasma chemistry in large part determines the effect of a plasma treatment. For example when biological tissue is plasma treated, the biological response depends on the plasma chemistry, e.g. the reactive species composition produces by the plasma source. This can be exploited in therapeutic applications, where the plasma chemistry can be tuned to yield a specific biological response.

REFERENCES

[1] Sun, P. P., et al. "*Close-packed arrays of plasma jets emanating from microcavitys in a transparent polymer.*" IEEE Transactions on Plasma Science 40.11 (2012): 2946-2950.

[2] Robert, Eric, et al. "*New insights on the propagation of pulsed atmospheric plasma streams: From single jet to multi jet arrays.*" Physics of Plasmas 22.12 (2015): 122007.

[3] Bansemer, R., Schmidt-Bleker, A., van Rienen, U., & Weltmann, K. D. (2017) "*Investigation and control of the O3 to NO transition in a novel sub-atmospheric pressure dielectric barrier discharge.*" Plasma Sources Science Technology 26(6).

We claim:

1. Modular plasma jet treatment system (1), for the treatment of biological materials or medical applications, comprising a plasma source (2) with at least the following components:

a high-voltage module (20) comprising a high-voltage electrode (21) and a first connection means for connecting the high-voltage module (20) with a plasma jet applicator (30), wherein the plasma jet applicator (30) is configured to generate with the high-voltage electrode of the high-voltage module (20) at least one plasma jet (35), wherein the plasma jet applicator (30) has a cavity (31) for a process gas (100), wherein a ceiling portion (32) of the cavity (31) is arranged on the high-voltage module (20) or arranged on the plasma jet applicator (30), the cavity (31) comprising a) a process gas inlet (33),
b) at least one plasma jet outlet (34), wherein the plasma jet applicator (30) comprises a second connection means, wherein the first and second connection means are configured such that the plasma jet applicator (30) and the high-voltage module (20) are repeatedly connectable and releasable, characterized in that, when the plasma jet applicator (30) is connected to the high-voltage module (20), the cavity (31) is adjacently arranged with the ceiling portion (32) at the high-voltage module (20), and wherein the cavity (31) is separated by a dielectric (23, 47) from the high-voltage electrode (21) of the high-voltage module (20).

2. System according to claim 1, wherein the high-voltage electrode (21) of the high-voltage module (20) has a surface (22) facing towards the cavity (31), wherein said surface (22) is planar comprises a surface area of at least 1 cm².

3. System according to claim 1, wherein the ceiling portion (32) of the cavity (31) comprises a second electrode (39), wherein the second electrode (39) is kept at a floating electric potential, when a plasma is generated in the plasma jet applicator (30).

4. System according to claim 1, wherein the plasma jet applicator (30) comprises a dielectric layer (40) with an electric permittivity of greater than 20, wherein said dielectric layer (40) is arranged on the ceiling portion (32) of the cavity (31).

5. System according to claim 1, wherein the plasma jet applicator (30) comprises a planar high-voltage electrode (38) that is configured such that it is in electrical contact with the high-voltage electrode (21) of the high-voltage module (20), when the plasma jet applicator (30) is connected to the high-voltage module (20).

6. System according to claim 1, wherein the plasma jet applicator (30) comprises a planar bottom portion (37) that is arranged opposite the ceiling portion (32), wherein the at least one plasma outlet (34) is arranged at the bottom portion (37).

7. System according to claim 1, wherein the plasma jet applicator (30) comprises a ground electrode (4).

8. System according to claim 7, wherein the high-voltage module (20) comprises at least one electrical conducting connector (42) for the ground electrode (4) and wherein the ground electrode (4) is connected to said electrical connector (42), when the plasma jet applicator (39) is connected to the high-voltage module (20).

9. System according to claim 1, wherein the plasma jet applicator (30) comprises a plurality of plasma jet outlets (34), wherein the plasma jet outlets (34) are arranged in an array.

10. System according to claim 1, wherein the system (1) comprises a second plasma jet applicator.

11. System according to claim 3, wherein the second electrode (39) is planar and is arranged opposite the plasma jet outlets (34).

12. System according to claim 1, wherein the system is configured such that a plasma can only generated if all connectors (42) of the at least one connector (42) are electrically connected with the ground electrode (4) of the plasma jet applicator (30).

13. System according to claim 1, wherein the plasma jet applicator (30) comprises at least one curtain gas channel (44) with at least one curtain gas outlet (50) that is designed for sheathing the process gas (100) and/or plasma (35) with a curtain gas (101), when the plasma (35) exits the at least one plasma jet outlet (34).

14. System according to claim 1, wherein the system (1) comprises a first humidifying means (45) that is configured and arranged for humidifying a process gas (100) or a precursor process gas (102).

15. System according claim 1, wherein the system (1) comprises an upstream plasma source (6) that is arranged upstream the plasma source (2) and configured to generate a plasma from a precursor-process gas (102), wherein the plasma generated by the upstream plasma source (6) comprises the process gas (100), wherein the system is configured to provide the process gas (100) to the plasma source (2) for generating a plasma (35) with the process gas (100).

* * * * *